United States Patent
Wei et al.

(10) Patent No.: US 10,377,506 B2
(45) Date of Patent: Aug. 13, 2019

(54) BRAKING SYSTEM AND PASSENGER BOARDING BRIDGE

(71) Applicants: CHINA INTERNATIONAL MARINE CONTAINERS (GROUP) LTD., Guangdong (CN); SHENZHEN CIMC-TIANDA AIRPORT SUPPORT LTD., Guangdong (CN)

(72) Inventors: Feipeng Wei, Shenzhen (CN); Wei Xiang, Shenzhen (CN); Jianming Huang, Shenzhen (CN); Jifang Nie, Shenzhen (CN)

(73) Assignees: CHINA INTERNATIONAL MARINE CONTAINERS (GROUP) LTD, Guangdong (CN); SHENZHEN CIMC-TIANDA AIRPORT SUPPORT LTD, Guangdong (CN)

( * ) Notice: Subject to any disclaimer, the term of this patent is extended or adjusted under 35 U.S.C. 154(b) by 0 days.

(21) Appl. No.: 15/747,429

(22) PCT Filed: Jul. 15, 2016

(86) PCT No.: PCT/CN2016/090121
§ 371 (c)(1),
(2) Date: Jan. 24, 2018

(87) PCT Pub. No.: WO2018/010161
PCT Pub. Date: Jan. 18, 2018

(65) Prior Publication Data
US 2019/0193869 A1    Jun. 27, 2019

(51) Int. Cl.
*B64F 1/00*    (2006.01)
*B64F 1/305*    (2006.01)
(Continued)

(52) U.S. Cl.
CPC ............ *B64F 1/305* (2013.01); *B64C 1/22* (2013.01); *B64F 1/31* (2013.01)

(58) Field of Classification Search
CPC ............ B64F 1/31; B64F 1/305; B64C 1/22
(Continued)

(56) References Cited

U.S. PATENT DOCUMENTS

| 3,412,412 A | 11/1968 | Kjerulf et al. |
| 4,333,194 A | 6/1982 | Drozd |
| 7,979,937 B2 * | 7/2011 | Tomioka ................ B64F 1/305 14/71.5 |

FOREIGN PATENT DOCUMENTS

| CN | 201610222 U | 10/2010 |
| CN | 201777389 U | 3/2011 |

(Continued)

*Primary Examiner* — Raymond W Addie
(74) *Attorney, Agent, or Firm* — Amster, Rothstein & Ebenstein LLP

(57) ABSTRACT

A braking system for a passenger boarding bridge are provided. The braking system includes a locking member fixedly mounted on the cabin and at least one set of braking assemblies. Each set of the braking assemblies includes an oscillating member rotatably mounted on the cab, an oscillating wheel mounted on the oscillating member and an elastic member having a pre-tightening force. The oscillating wheel cooperates with an outer side of the drive belt to form an abutting force so as to balance the pre-tightening force. The pre-tightening force of the elastic member rotates the oscillating member to a direction of the locking member and cooperates with the locking member in a locking manner to realize braking when the length of the drive belt between the driven wheel and the driving wheel exceeds a preset value or is in a broken state.

20 Claims, 9 Drawing Sheets

(51) Int. Cl.
 *B64C 1/22* (2006.01)
 *B64F 1/31* (2006.01)
(58) Field of Classification Search
 USPC .......................................................... 14/71.5
 See application file for complete search history.

(56) References Cited

FOREIGN PATENT DOCUMENTS

| | | | | |
|---|---|---|---|---|
| CN | 102320381 A | | 1/2012 | |
| CN | 102991693 A | * | 3/2013 | .............. B64F 1/305 |
| CN | 104260898 A | | 1/2015 | |

* cited by examiner

BRAKING SYSTEM AND PASSENGER BOARDING BRIDGE

CROSS REFERENCE

The present application is based on International Application No. PCT/CN2016/090121, filed on Jul. 15, 2016, and the entire contents thereof are incorporated herein by reference.

TECHNICAL FIELD

The present disclosure relates to a braking system for a passenger boarding bridge and a passenger boarding bridge.

BACKGROUND

A cab is a component of the passenger boarding bridge that comes into direct contact with a aircraft door when an aircraft is in a stop position. In order to achieve a close and reliable connection between the cab and the aircraft door, it is required to adjust a docking angle of the cab, and thereby the cab is pivotably connected to the tunnel and is driven by the rotationally driving device to rotate around a cabin of the tunnel.

The rotationally driving device of the existing cab is composed of a driving motor, a chain, sprocket wheels, wherein the driving motor is fixedly mounted on the cab, and drives the sprocket wheels to connect with an output shaft of the driving motor via an appropriate reducing mechanism. The chain is fixed on the tunnel, and in particular on the periphery of the cabin. The chain can be engaged with the driving sprocket wheel and engaged with an appropriate intermediate sprocket wheel. During operation, the driving motor is rotated such that the driving sprocket wheel is rotatable while engaging with the chain, thereby driving the cab to rotate around the cabin.

However, the existing rotationally driving device has a risk of chain disconnection, which becomes a major factor for lose effectiveness of the cab rotating system. As a result of this, it is required to improve the existing technology to improve safety factor of docking the cab with the aircraft door.

In order to solve the above problem and improve the safety margin, a double-chain driving device of the cab of the passenger boarding bridge was disclosed in Chinese Patent Application (No. CN10299169A) as filed on Oct. 16, 2012. The double-chain driving device includes a driving motor, a first sprocket wheel and a double-row chain. The driving motor drives the first sprocket wheel, and the first sprocket wheel can be engaged with the double-row chain to drive the cab rotatable relative to the tunnel. The minimum breaking force of the chain can be doubled by using a double-row chain. In addition, the chain also includes a detection device for detecting working state of the chain on the ends, to make an alarm when the chain is disconnected or a nut for fixing the chain is loosened. The above patent application is incorporated by reference as if set forth herein.

In the above solution, at least double-chain drives jointly to reduce the risk caused when one of the chains is broken. And, the detection device may make a fault alarm in time when the fault occurs.

However, there are still some detects in the existing solutions described above, for example, reaction for the chain being broken may be lagged, thereby the driving device in a normal operation cannot prompt that the chain is broken. Internal friction caused by different tightness of the two chains can be increased and an auxiliary chain is worn severely, thereby the follow-up maintenance cost will be increased. Despite provision of a detection device and an alarm device, no further measure taken for the chain disconnection can be provided, which cannot avoid occurrence of device damage, and even danger against the personnel's life.

The information as disclosed in the technical background portion merely serves to reinforce understanding of the background of the present disclosure, thereby including information that does not form the prior art that has been already known by the person skilled in the art.

SUMMARY

According to one aspect of the present disclosure, it provides a braking system for a passenger boarding bridge that includes a tunnel having a cabin, a cab and a rotationally driving device that includes a driving motor mounted on the cab, a driving wheel mounted on an output shaft of the driving motor, and two driven wheels mounted on the tunnel and one drive belt being in cooperation with the driving wheels and the driven wheels, and having two ends fixed on the cabin respectively, wherein the braking system includes a locking member fixedly mounted on the cabin, and at least one set of braking assemblies, each of which includes an oscillating member rotatably mounted on the cab, an oscillating wheel mounted on the oscillating member and an elastic member, wherein the elastic member presents a pre-tightening force, the oscillating wheel cooperates with an outer side of the drive belt to form an abutting force so as to balance the pre-tightening force of the elastic member when the drive belt is in a normal working state, the pre-tightening force of the elastic member rotates the oscillating member to a direction of the locking member and cooperates with the locking member in a locking manner to realize braking when the length of the drive belt between the driven wheel and the driving wheel exceeds a preset value or is in a broken state.

According to another aspect of the present disclosure, a passenger boarding bridge includes a tunnel having a cabin, a cab and a rotationally driving device for driving rotation of the cab, wherein further includes the braking system according to the present disclosure.

The foregoing features, aspects and advantages of the present disclosure will become more apparent from the following detailed description of the present disclosure when taken in conjunction with the accompanying drawings.

Figure 1A:
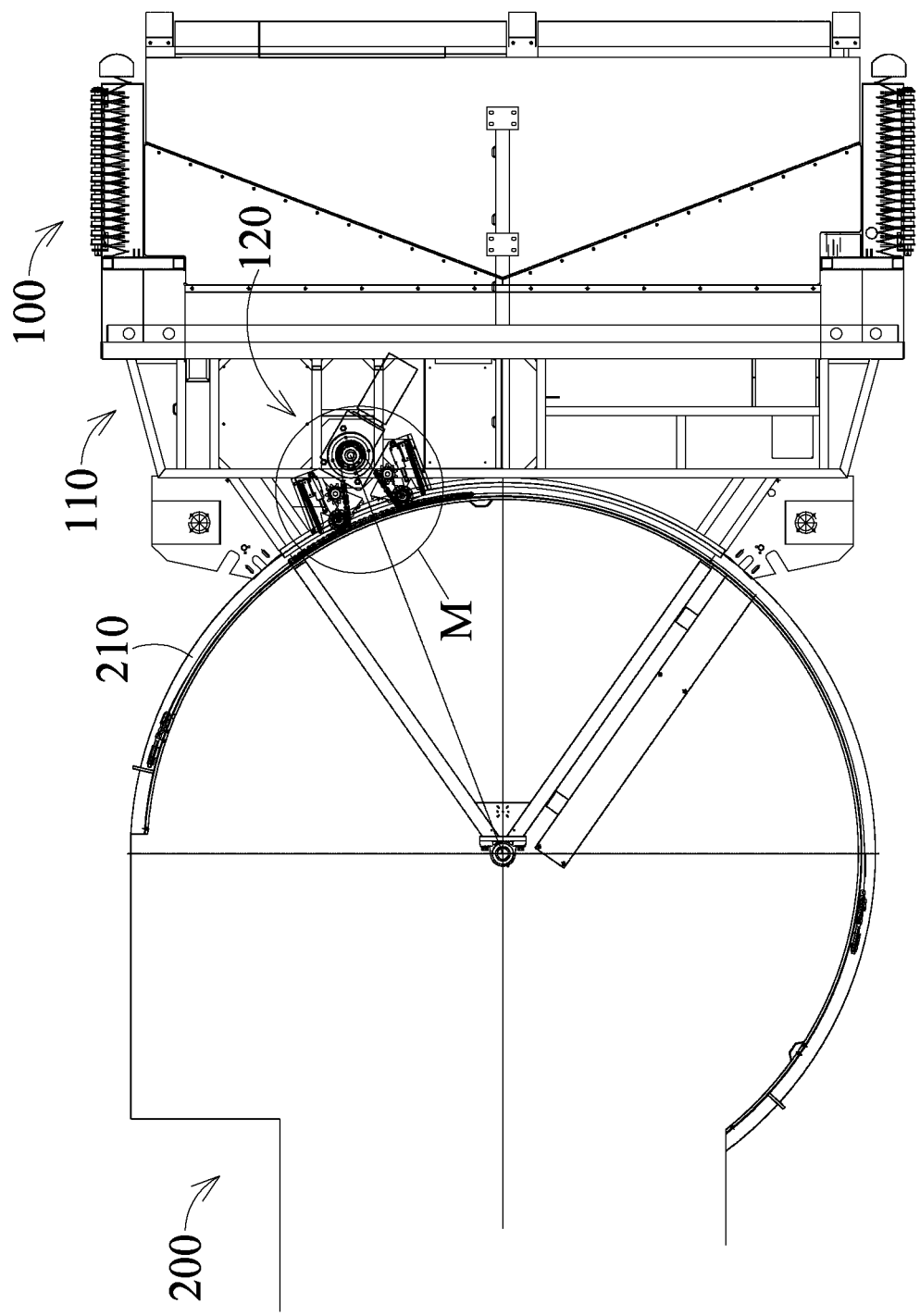
FIG. 1A shows a schematic view of one embodiment of a passenger boarding bridge according to the present disclosure.

The main reference numbers in the drawings are presented below: 1. driving motor; 2. driving sprocket wheel; 3. driven sprocket wheel; 30. driven sprocket wheel shaft; 5. drive chain; 7. first oscillating teeth plate; 70. loop; 71. pivot shaft; 72. engaging tooth 7'. second oscillating teeth plate; 8. first oscillating sprocket wheel; 8'. second oscillating sprocket wheel; 80. first oscillating sprocket wheel shaft; 10. first support; 12. first tension spring; 12'. second tension spring; 13. braking chain; 14. first braking limit switch; 14'. second braking limit switch; 200. tunnel; 100. cab; 110. frame; 120. rotationally driving device; 210. cabin.

DETAILED DESCRIPTION

Now, the exemplary embodiments will be described more fully with reference to the accompany drawings. However, the exemplary embodiments can be implemented in various forms and should not be construed as limited to the embodiments set forth herein. Instead, these embodiments are provided so that the present disclosure will be thorough and complete, and the concept of the exemplary embodiment will fully conveyed to those skilled in the art. Same reference signs denote the same or similar structures in the accompany drawings, and thus the detailed description thereof will be omitted.

Figure 1B:
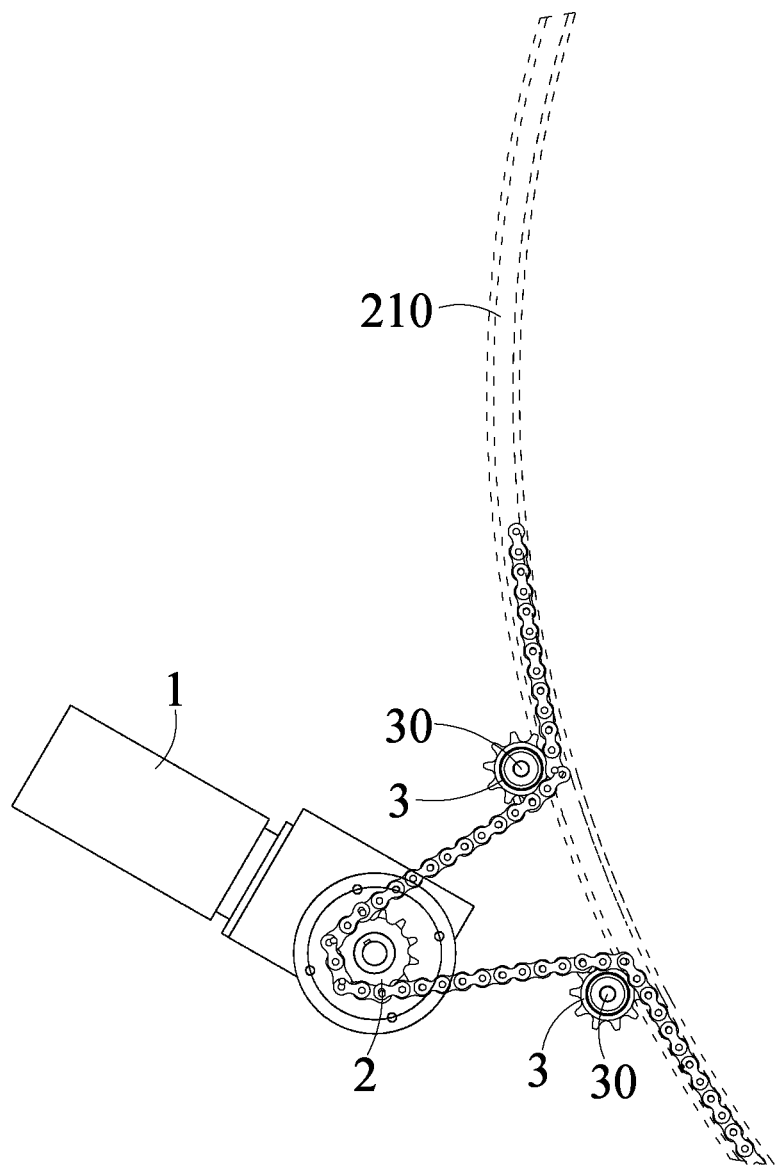
FIG. 1B shows a schematic view of a rotationally driving device in the passenger boarding bridge of FIG. 1A.
Figure 1C:
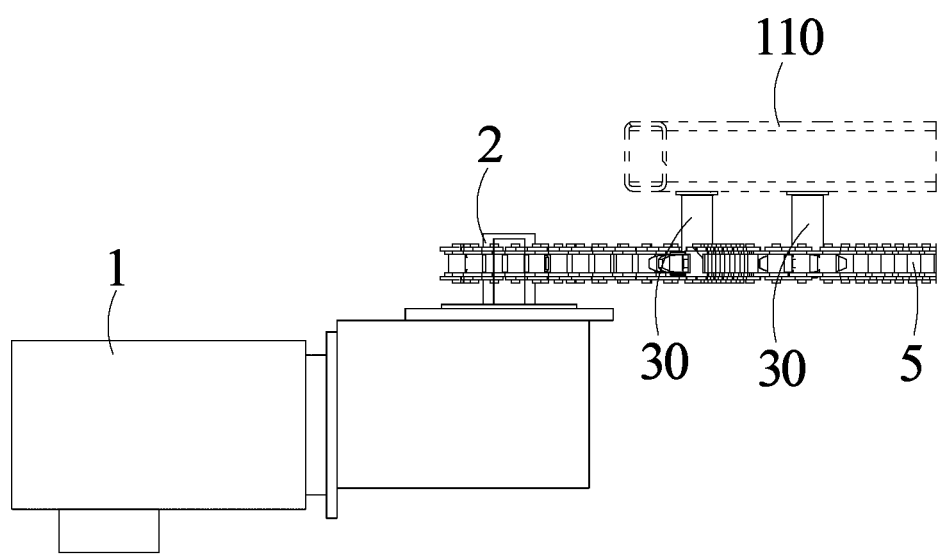
FIG. 1C shows a bottom view of FIG. 1B.

Referring to FIG. 1A, FIG. 1B and FIG. 1C, FIG. 1A shows a schematic view of one embodiment of a passenger boarding bridge according to the present disclosure; FIG. 1B shows a schematic view of a rotationally driving device in the passenger boarding bridge of FIG. 1A, wherein the cab is not shown in order to show the structure of the rotationally driving device clearly; and FIG. 1C shows a bottom view of FIG. 1B.

As shown in FIG. 1A, a passenger boarding bridge according to one embodiment of the present disclosure includes a tunnel 200 and cab 100. Wherein, a cabin 210 is arranged at the end of the tunnel 200. A cab 100 includes a frame 110, on which a rotationally driving device 120 that can drive the cab 100 to rotate relative to the tunnel 200 is mounted.

As shown in FIG. 1B and FIG. 1C, the rotationally driving device 120 includes a driving motor 1, a driven sprocket wheel 2, a drive chain 5, and two driven sprocket wheel shafts 30. The driving motor 1 is mounted on the frame 110 of the cab 100, and the output shaft of the driving motor 1 is connected to the driven sprocket wheel 2 to drive the driven sprocket wheels 2 to rotate. The driven sprocket wheel shafts 30 are fixed on the frame 110 of cab 100 and driven sprocket wheels 3 are freely and rotatably mounted on the driven sprocket wheel shafts 30. The drive chain 5 respectively extends around one driven sprocket wheel 3, the driven sprocket wheel 2 and the other driven sprocket wheel 3 and can be engaged with driven sprocket wheels 3 and the driven sprocket wheel 2. Both ends of the drive chain 5 are fixed on the cabin 210 of the tunnel 200, respectively, as described in the Chinese Patent Application (No. CN10299169A).

As shown in FIG. 1B, the two driven sprocket wheels 3 are located on both sides of driven sprocket wheel 2 such that the drive chain 5 between the two driven sprocket wheels 3 is in a "V" shape. When the cab 100 is intended to be rotated, the driving motor 1 is operated to rotate, for example, in a clockwise direction. Rotation of the driving motor 1 drives the driven sprocket wheel 2 to rotate, and then the driven sprocket wheel 2 drives the drive chain to move, thereby causing the cab 100 to rotate relative to the tunnel 200, for example, in a clockwise direction.

It should be understood that the rotationally driving device 120 is not necessary to have the structure described in detail above. For example, the driven sprocket wheel 2 may also be replaced by other driving belt wheels, such as driving pulleys, correspondingly, the drive chain 5 is replaced by a belt, and the driven sprocket wheels 3 are replaced by the driven belt pulleys. The rotationally driving device 120 has various specific types, and thereby the braking system of the present disclosure is also adaptively different.

Figure 2A:
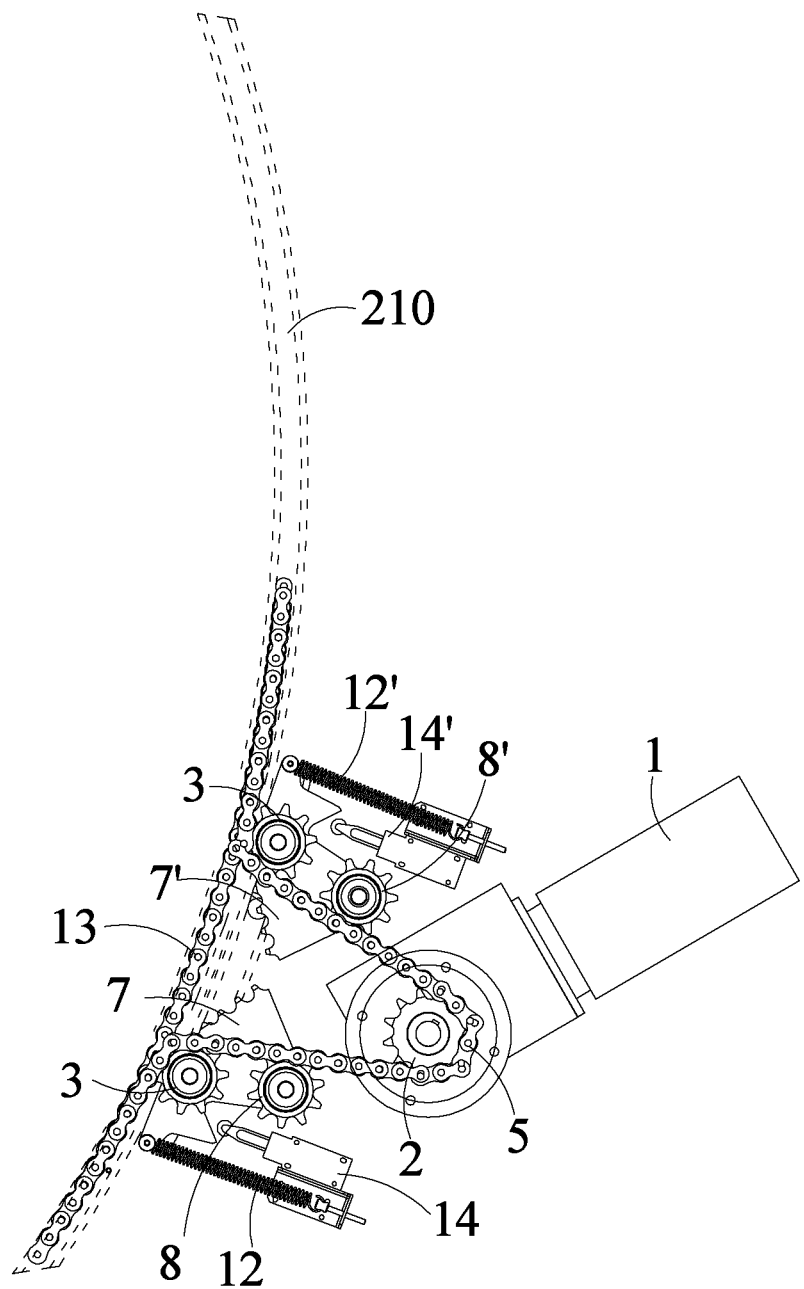
FIG. 2A shows a schematic view of a braking system according to one embodiment of the present disclosure.
Figure 2B:
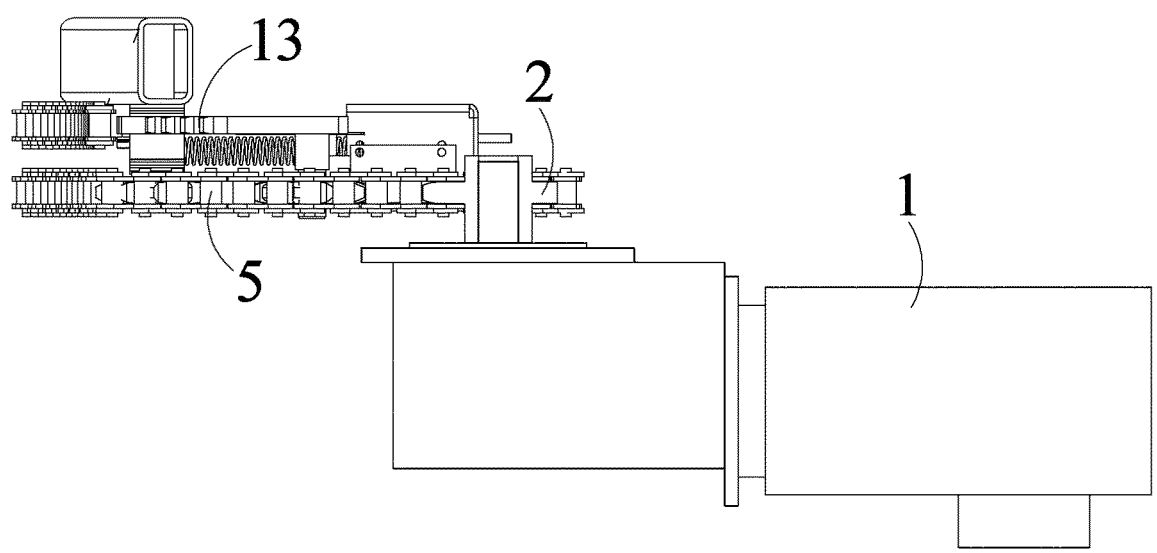
FIG. 2B shows a bottom view of FIG. 2A.
Figure 3:
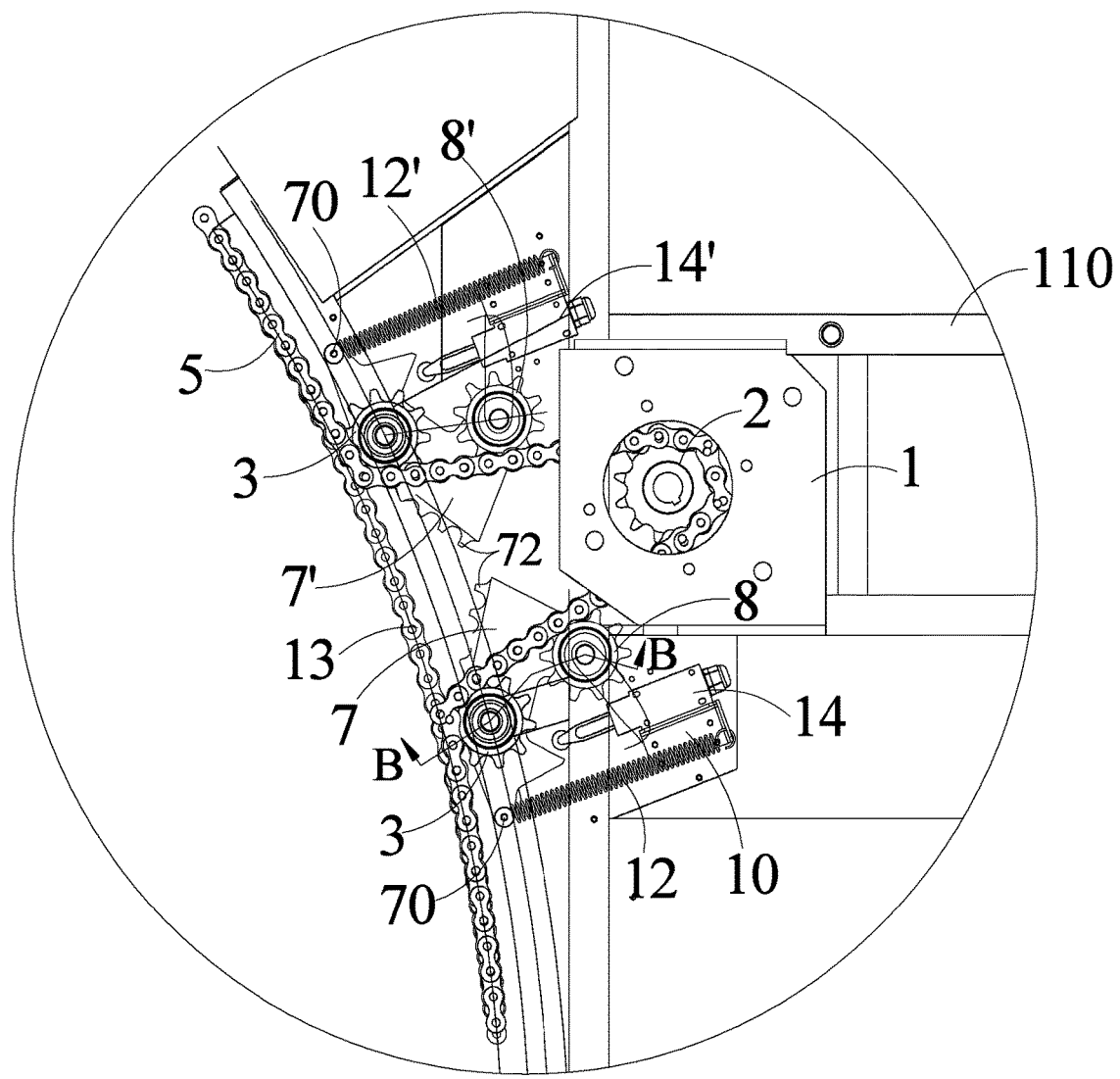
FIG. 3 is a partial enlargement view of section M in FIG. 1A, similar to FIG. 2A, more clearly showing a braking system, wherein the braking system is in a non-braked state.
Figure 4:
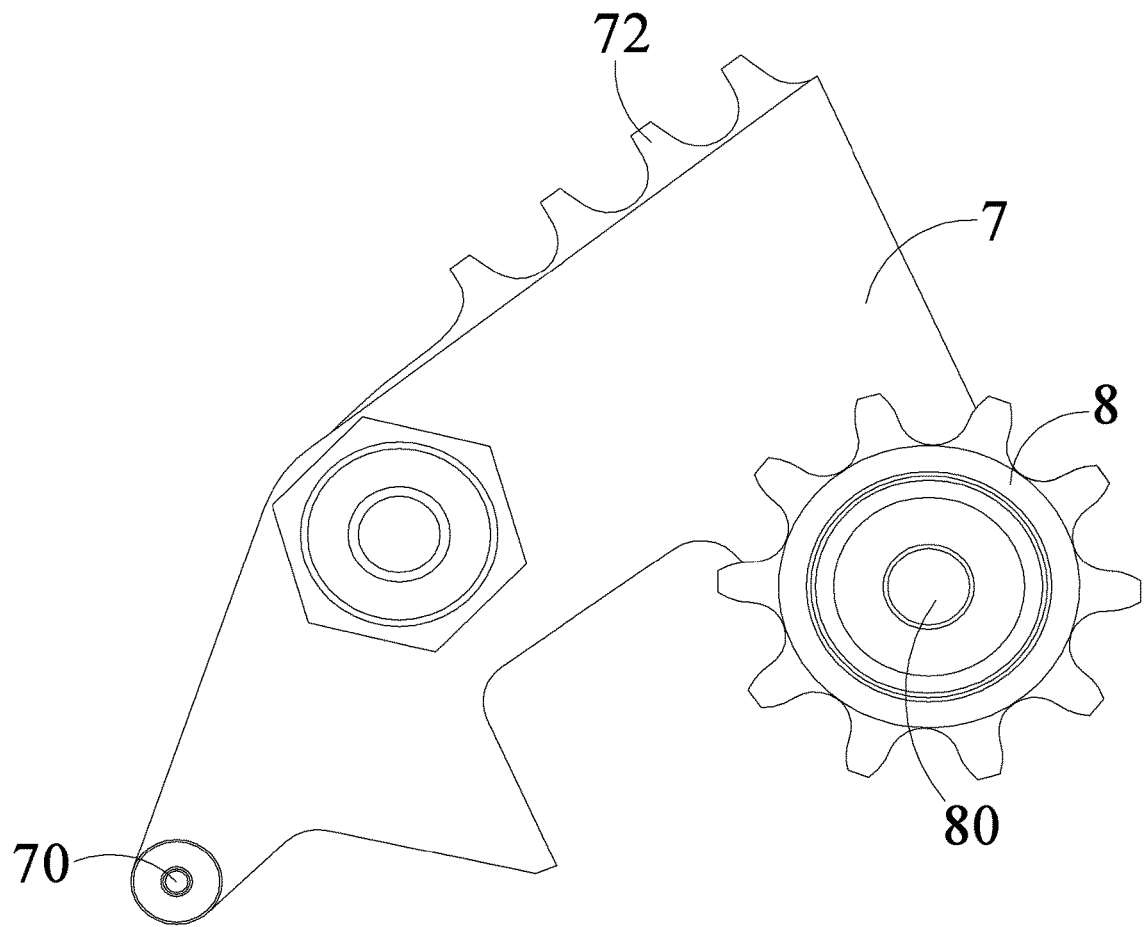
FIG. 4 shows a schematic view of an oscillating teeth plate in one embodiment of the braking system according to the present disclosure.
Figure 5:
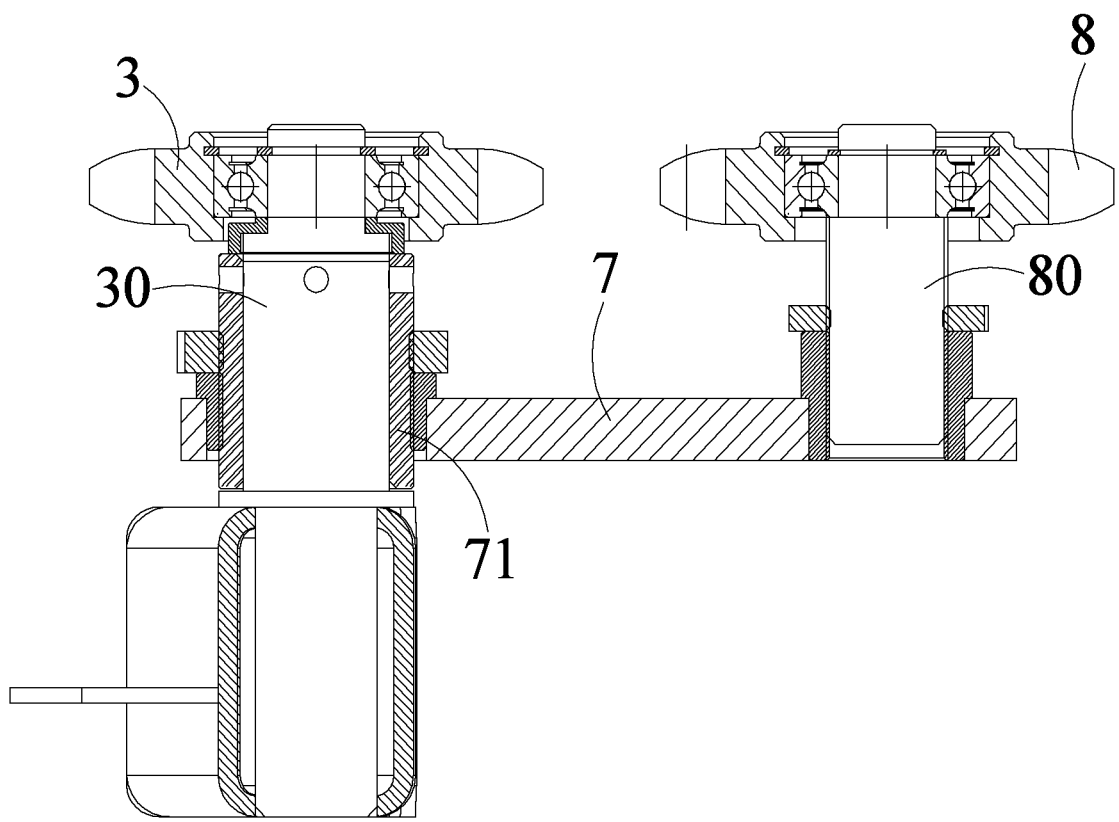
FIG. 5 shows a sectional view taken along a line B-B of FIG. 3.

The braking system according to the present disclosure will be described in detail below with reference to FIG. 2A to FIG. 5. FIG. 2A shows a schematic view of a braking system according to one embodiment of the present disclosure, the cab is not shown in order to show the structure of the rotationally driving device clearly; FIG. 2B shows a bottom view of FIG. 2A; FIG. 3 is a partial enlargement view of section M in FIG. 1A, similar to FIG. 2A, more clearly showing a braking system, wherein the braking system is in a non-braked state; FIG. 4 shows a schematic view of an oscillating teeth plate according to one embodiment of the present disclosure; and FIG. 5 shows a sectional view taken along a line B-B of FIG. 3.

As shown in FIG. 2A and FIG. 2B, the braking system according to one embodiment of the present disclosure includes a locking member, a first braking assembly and a second braking assembly. The locking member may be, for example, a braking chain 13 that is fixedly mounted on the tunnel 200, and for example is fixed in a rail groove of the cabin 210 of the tunnel 200.

In the embodiment as shown in FIG. 2A, the braking system includes two sets of braking assemblies, i.e., a first braking assembly and a second braking assembly. The first braking assembly and the second braking assembly are symmetrically arranged outside of the "V"-shaped portion of the drive belt. In other embodiments, the number of the braking assemblies is not limited to two sets, for example, only one set of braking assemblies may be arranged at a position of the drive chain which is likely to be broken or loosened; or three or more sets of the braking assemblies may also be provided at a plurality of different components of the drive chain. Wherein the drive belt such as drive chain between the driven wheel and the driving wheel being loosened means that a length of the drive belt such as drive chain between the driven wheel and the driving wheel exceeds a set value that may be 0.5 mm, 1 mm, 2 mm, 3 mm, 5 mm, 8 mm, 10 mm, 15 mm, 20 mm, 30 mm and the like.

As shown in FIG. 3, the first braking assembly and the second braking assembly are mounted on the frame 110 of the cab 100, respectively. The first braking assembly includes a first oscillating teeth plate 7, a first oscillating sprocket wheel 8, a first tension spring 12 and a first braking limit switch 14. The second braking assembly includes a second oscillating teeth plate 7', second oscillating sprocket wheel 8', a second tension spring 12' and second braking limit switch 14'. Since the first braking assembly and the second braking assembly are basically presented in mirror image relationship, the first braking assembly will be described in detail below, and contents as described for the first braking assembly may equally be applied to the second braking assembly.

As shown in FIG. 3, FIG. 4, and FIG. 5, the first oscillating teeth plate 7 is generally flat-plate shaped and is pivotally mounted on the frame 110 of the cab 100 by using a pivot shaft 71 that is substantially perpendicular to the surface of the flat-plate. Preferably, as shown in FIG. 5, the pivot shaft 71 is coaxial with the driven sprocket wheel shafts 30 of the driven sprocket wheels 3, herein, the first oscillating teeth plate 7 may also be directly and fixedly connected to the driven sprocket wheel shafts 30 of the driven sprocket wheels 3. A first oscillating sprocket wheel shaft 80 is vertically arranged and protrudes at one end of the first oscillating teeth plate 7 and is arranged in parallel with the pivot shaft 71 (the driven sprocket wheel shaft 30), and a first oscillating sprocket wheel 8 may be freely and rotatably arranged on the first oscillating sprocket wheel shaft 80. Furthermore, the first oscillating sprocket wheel 8 and the driven sprocket wheel 3 may be arranged on the same plane, thereby the first oscillating sprocket wheel 8 and the driven sprocket wheel 3 can be simultaneously engaged with the outer side of the drive chain 5. A loop 70 is arranged at the end of the first oscillating teeth plate 7 opposite to the first oscillating sprocket wheel shaft 80. a plurality of meshing teeth 72 are arranged on one side of the first oscillating teeth plate 7 facing the braking chain 13, as described below, the meshing teeth 72 may be engaged with the braking chain 13 when the first oscillating teeth plate 7 oscillates towards the braking chain 13.

As shown in FIG. 3, the first braking assembly further includes a first support 10 that is fixed on the frame 110 of the cab 100. The first tension spring 12 has one end that is attached to the loop 70 of the first oscillating teeth plate 7 and the other end that is connected to the first support 10. The first tension spring 12 is pre-loaded, i.e., has a pre-tightening force, such that the meshing teeth 72 of the first oscillating teeth plate 7 have a tendency to move to a direction of the braking chain 13.

In one embodiment, a first braking limit switch 14 is arranged on the cab 100. The first braking limit switch 14 may be arranged in the vicinity of the first oscillating teeth plate 7, for example, between the first oscillating teeth plate 7 and driven sprocket wheel 2, and a movable portion of the first braking limit switch 14 is arranged adjacent to the first oscillating teeth plate 7, such that oscillation of the first oscillating teeth plate 7 can trigger the first braking limit switch 14.

Figure 6:
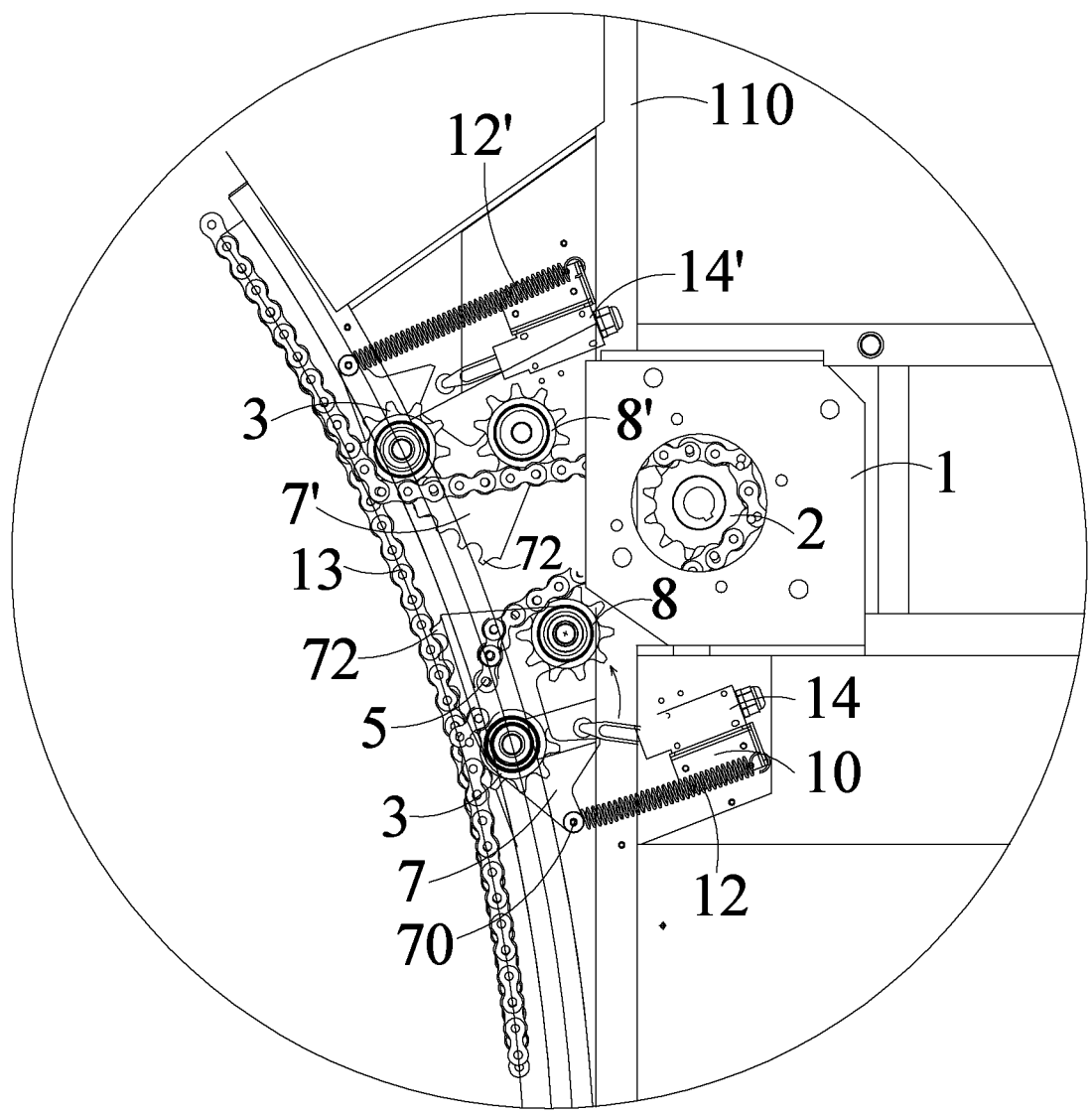
FIG. 6 shows a schematic view of a first braking assembly being in a braked state according to one embodiment of the present disclosure.

The operation of the braking system according to the present disclosure will be described in detail with reference to FIG. 3 and FIG. 6, wherein FIG. 6 is a schematic view showing that the first braking assembly is in a braked state, and FIG. 3 is a schematic view showing that the first braking assembly is in a non-braked state. Since the braking processes of the first and second braking assemblies are substantially the same, the first braking assembly is hereinafter will be described as an example.

As shown in FIG. 3, in a normal working state of the rotationally driving device 120, the drive chain 5 is in a tight state, both the first oscillating sprocket wheel 8 and the driven sprocket wheel 3 are engaged with the outer side of the drive chain 5, and the drive chain 5 possesses an outward abutting force against the first oscillating sprocket wheel 8 to balance the pre-tightening force of the first tension spring 12, such that the meshing teeth 72 of the first oscillating teeth plate 7 remain in a divorced state from the braking chain 13, and thereby do not take any braking action on the cab 100. Under the action of the driving motor 1, the cab 100 may be rotated in a clockwise or counterclockwise manner relative to the tunnel 200.

As shown in FIG. 6, when the first side portion of the drive chain 5, for example, the left side portion is broken, the tensioning force of the drive chain 5 is lost, thereby the first oscillating teeth plate 7 oscillates around the driven sprocket wheel shaft 30 in a counterclockwise direction under the action of the first tension spring 12, as shown by an arrow of FIG. 6. The meshing teeth 72 formed on the first oscillating teeth plate 7 are sequentially inserted into the braking chain 13 and engaged with the braking chain 13 to stop rotating the cab 100 but to brake. At the same time, when the first oscillating teeth plate 7 is engaged with the braking chain 13, the first braking limit switch 14 is triggered by the first oscillating teeth plate 7 to send a trigger signal to a control system of the passenger boarding bridge while the first braking limit switch 14 is triggered, thereby the control system controls the driving motor 1 to stop rotating according to the trigger signal.

The second braking assembly brakes the cab 100 in an operation substantially the same with the first braking assembly when the drive chain 5 on the second side portion, for example, the right side portion of the driven sprocket wheel 2, is broken or loosened.

In order to prevent fault braking, a distance between the meshing teeth of the first oscillating teeth plate 7 and the second oscillating teeth plate 7' and the braking chain 13 is configured such that the first oscillating teeth plate 7 and the second oscillating teeth plate 7' oscillate by enough angle such that the meshing teeth can be engaged with the braking rack when chain length on the first side (left side) of the second side (right side) of the driven sprocket wheel 2 is increased by more than 30 mm, thereby such structure will brake, but if the chain length of the first side or the second side fluctuates within a one chain pitch (approximately 25 mm), this structure will not brake to avoid fault braking.

In one embodiment, the present disclosure can realize interlock control, reset control and override control while cab 100 braking can be achieved.

The interlock control is presented that if the first braking limit switch 14 on either side is triggered, the driving motor 1 of the cab 100 switches off, the motor brakes (rotation of the cab 100 with power is prohibited), while the LCD sends a red alarm message "cab rotary system fault", and thereby buzzer makes an alarm lasting for about 15 seconds.

The reset control is presented that if the reset button in the electrical control cabinet is pressed once (no matter whether the time is longer or not) in a maintenance mode, the first braking limit switch 14 will be reset (both are OFF) and allow the driving motor 1 of the cab 100 to rotate right and left, otherwise, still remain in the interlock control state.

The override control is presented that if the oscillating teeth plate on either side is still stuck in the self-locking state but cannot reset or has brake limit switch fault, the cab 100 can rotate right and left and thereby can override in order to settle the fault.

Although the embodiments of the braking system including the oscillating teeth plate, the oscillating sprocket wheel, the tension spring and the braking chain are described above, the present disclosure is not limited thereto. In other embodiments, the braking chain 13 may also be a rack or other types of locking members, such as the locking member with a bump structure or the locking member with a friction structure; and accordingly, the meshing teeth on the oscillating teeth plate can also be substituted for a structure that can be matched with the rack, the bump structure or the friction structure on the locking member. For example, instead of the braking chain and the oscillating teeth plate, a ratchet-to-rack fit may be used, or a friction braking mechanism may be used. For example, a braking band is arranged on the cab tunnel and a braking pad is arranged on one side of the oscillating teeth plate facing the braking band, so that when the drive chain is broken, the brake pad is pressed on the brake band by virtue of the tension spring, and thereby the same braking function can be achieved; or a rail system with high friction coefficient and a cam mechanism and the like can be designed. In addition, the tension spring can be replaced by an elastic member, such as a compression spring or a torsion spring, for example, when the oscillating sprocket wheel is mounted on the cab by means of a pivot shaft, the torsion spring may be mounted on the pivot shaft, which also functions as the tension spring.

INDUSTRIAL APPLICABILITY

The braking system of the present disclosure adopts mechanical braking mode without electrical control. The braking system can brake immediately to stop rotation of the cab when the drive belt is broken or loosened, as a result, it is possible to brake timely and reliably to avoid safety risk of the passenger boarding bridge cab due to the broken or loosened drive belt such that people's safety can be protected well. In the present disclosure, it is not necessary to use two drive chains, thereby avoiding the internal friction caused due to different tightness of the two drive chains, to reduce power consumption during the normal operation of the driving motor and facilitate for saving operation cost.

Although the present disclosure has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, but should be construed broadly within the spirit and scope of the present invention as defined in the appended claims. Therefore, the present disclosure is intended to cover various modification and equivalent arrangement fallen within the spirit and scope of the attached claims.

The relativity words, such as "upper" or "lower", as used herein, are used to describe the relative relationship of the referenced component to another component. These words are used herein for convenience only, for example, according to the direction of the illustrative examples as shown in the figures. It is appreciated that if the referenced device is inversed upside down, the component indicated as being the "upper" side would become the component on the "lower" side. When one structure is "on" another structure, it is possible to indicate that the one structure is integrally formed on the other structure, or the one structure is "directly" arranged on the other structure, or one structure is "indirectly" formed on the other structure by means of a further structure. In addition, the words "first", "second", or the like, as used in claims, are meant to indication, but not to limit the object to which they modify.

The terms "a", "an", "the", "said" and "at least one", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like.

It should be understood that the present disclosure would never be limited to the detailed construction and arrangement of components as set forth in this specification. The present disclosure has other embodiments that can be practiced or carried out in various ways. The foregoing variations and modifications fall within the scope of the present disclosure. It should be understood that the present disclosure would contain all alternative combination of two or more individual features as mentioned or distinct from in the text and/or in the drawings. All of these different combinations constitute a number of alternative aspects of the present disclosure. The embodiments as illustrated in this specification are the best modes known to achieve the present disclosure and will enable one skilled in the art to realize the present disclosure.

What is claimed is:

1. A braking system for a passenger boarding bridge that comprises a tunnel having a cabin, a cab and a rotationally driving device that comprises a driving motor mounted on the cab, a driving wheel mounted on an output shaft of the driving motor, and two driven wheels mounted on the tunnel and one drive belt being in cooperation with the driving wheels and the driven wheels, and having two ends fixed on the cabin respectively, wherein the braking system comprises:
a locking member fixedly mounted on the cabin;
at least one set of braking assemblies, each of which comprises an oscillating member rotatably mounted on the cab, an oscillating wheel mounted on the oscillating member and an elastic member, wherein the elastic member presents a pre-tightening force, the oscillating wheel cooperates with an outer side of the drive belt to form an abutting force so as to balance the pre-tightening force of the elastic member when the drive belt is in a normal working state, the pre-tightening force of the elastic member rotates the oscillating member to a direction of the locking member and cooperates with the locking member in a locking manner to realize braking when the length of the drive belt between the driven wheel and the driving wheel exceeds a preset value or is in a broken state.

2. A passenger boarding bridge comprising a tunnel having a cabin, a cab and a rotationally driving device for driving rotation of the cab, wherein the passenger boarding bridge further comprises the braking system according to claim 1.

3. The braking system according to claim 1, wherein a first friction structure is provided on the locking member, and a second friction structure that can cooperate with the first friction structure is provided on the oscillating member.

4. The braking system according to claim 1, wherein the oscillating member is fixed on a shaft of the driven wheel.

5. The braking system according to claim 1, wherein the oscillating member matches with the locking member in a locking manner to realize braking when the drive belt is loosened or the portion of the drive belt between the driven wheel and the driving wheel is broken.

6. The braking system according to claim 1, wherein both of the driving wheel and the driven wheel are sprocket wheels, the drive belt is a drive chain, and the oscillating wheel is an oscillating sprocket wheel.

7. The braking system according to claim 6, wherein the braking assembly further comprises:
a braking limit switch, which is triggered during the oscillating member is rotated to a direction of the locking member.

8. The braking system according to claim 1, wherein a portion of the drive belt between the two driven wheels is in a "V" shape; the braking assembly comprises two sets that are a first braking assembly and a second braking assembly symmetrically arranged outside the "V"-shaped portion of the drive belt.

9. The braking system according to claim 8, wherein the braking assembly further comprises:
   a braking limit switch, which is triggered during the oscillating member is rotated to a direction of the locking member.

10. The braking system according to claim 1, wherein the locking member is a chain or a rack, and a plurality of meshing teeth that can be engaged with the chain or the rack are provided on the oscillating member.

11. The braking system according to claim 10, wherein the braking assembly further comprises:
   a braking limit switch, which is triggered during the oscillating member is rotated to a direction of the locking member.

12. The braking system according to claim 1, wherein a bump structure is provided on the locking member, and a groove structure that can match with the bump structure is provided on the oscillating member.

13. The braking system according to claim 12, wherein the braking assembly further comprises:
   a braking limit switch, which is triggered during the oscillating member is rotated to a direction of the locking member.

14. The braking system according to claim 1, wherein the elastic member is a tension spring or a compression spring, and has one end connected to the oscillating member and the other end connected to the cab.

15. The braking system according to claim 14, wherein the braking assembly further comprises:
   a braking limit switch, which is triggered during the oscillating member is rotated to a direction of the locking member.

16. The braking system according to claim 1, wherein the oscillating member is mounted on the cab through a pivot shaft, and the elastic member is a torsion spring mounted on the pivot shaft.

17. The braking system according to claim 16, wherein the braking assembly further comprises:
   a braking limit switch, which is triggered during the oscillating member is rotated to a direction of the locking member.

18. The braking system according to claim 1, wherein the braking assembly further comprises:
   a braking limit switch, which is triggered during the oscillating member is rotated to a direction of the locking member.

19. The braking system according to claim 18, wherein the braking limit switch is installed on the cab, and has a movable portion that is located on a oscillating trace of the oscillating member.

20. The braking system according to claim 18, wherein the braking limit switch sends a trigger signal to a control system of the passenger boarding bridge as being triggered, and the control system controls the driving motor to stop rotating according to the triggered signal.

* * * * *

UNITED STATES PATENT AND TRADEMARK OFFICE
CERTIFICATE OF CORRECTION

PATENT NO. : 10,377,506 B2  
APPLICATION NO. : 15/747429  
DATED : August 13, 2019  
INVENTOR(S) : Feipeng Wei et al.

Page 1 of 1

It is certified that error appears in the above-identified patent and that said Letters Patent is hereby corrected as shown below:

In the Specification

Column 2, Line 22, "tunnel" should be changed to --cab--.
Column 2, Line 24, the first "wheels" should read --wheel--.
Column 3, Line 52, "wheels" should read --wheel--.
Column 3, Lines 47, 51, 59 and 64, "driven" should read --driving--.
Column 3, Lines 52 and 57, the first "driven" should read --driving--.
Column 4, Lines 2, 3 and 8, "driven" should read --driving--.
Column 5, Line 41, "driven" should read --driving--.
Column 6, Lines 21 and 30, "driven" should read --driving--.
Column 8, Line 22, "tunnel" should be changed to --cab--.
Column 8, Line 24, the first "wheels" should read --wheel--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*